United States Patent
Jagst et al.

(10) Patent No.: US 9,328,227 B2
(45) Date of Patent: May 3, 2016

(54) RUBBER MIXTURE

(71) Applicant: Continental Reifen Deutschland GmbH, Hannover (DE)

(72) Inventors: Eda Jagst, Hannover (DE); Juliane Jungk, Hannover (DE); Maria Izabel Fernandes de Alencar, Garbsen (DE); Ulrike Wangenheim, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 14/537,523

(22) Filed: Nov. 10, 2014

(65) Prior Publication Data
US 2015/0065627 A1 Mar. 5, 2015

Related U.S. Application Data

(63) Continuation of application No. PCT/EP2013/059324, filed on May 6, 2013.

(30) Foreign Application Priority Data

May 11, 2012 (EP) .................................... 12167661

(51) Int. Cl.
C08L 9/06 (2006.01)
C08K 5/098 (2006.01)
C08L 21/00 (2006.01)
B60C 1/00 (2006.01)
C08L 7/00 (2006.01)

(52) U.S. Cl.
CPC .................. C08L 9/06 (2013.01); B60C 1/0016 (2013.04); C08K 5/098 (2013.01); C08L 7/00 (2013.01); C08L 21/00 (2013.01); C08L 2205/03 (2013.01)

(58) Field of Classification Search
None
See application file for complete search history.

(56) References Cited

U.S. PATENT DOCUMENTS

| 6,242,523 | B1 * | 6/2001 | Blok et al. ................... 524/495 |
| 7,902,285 | B2 | 3/2011 | Dumke et al. |
| 8,318,861 | B2 | 11/2012 | Houjo et al. |
| 8,436,105 | B2 | 5/2013 | Kohlstrung et al. |
| 8,609,766 | B2 * | 12/2013 | Bette ......................... 525/92 C |
| 2006/0116465 | A1 * | 6/2006 | Hiza et al. ...................... 524/493 |
| 2006/0167160 | A1 * | 7/2006 | Nakagawa et al. ........... 524/442 |
| 2008/0009564 | A1 | 1/2008 | Robert et al. |
| 2011/0190416 | A1 | 8/2011 | Maesaka et al. |
| 2012/0136129 | A1 * | 5/2012 | Kohlstrung et al. . C08K 5/0025 526/220 |

FOREIGN PATENT DOCUMENTS

| JP | 3714750 B2 | 9/2005 |
| WO | 2010/000299 A1 | 1/2010 |
| WO | WO 2012000877 A1 * | 1/2012 |

OTHER PUBLICATIONS http://www.novares.de/uploads/media/Product_Programme.pdf, Mar. 2015.*
http://www.struktol.net/markets-products/rubber-additives/lubricants/zinc-soaps/struktol-ef-44.html, 2015.*
Grosch et al, "A New Laboratory Method to Determine the Traction and Wear Properties of Tire Tread Compounds Part II: Wear Evaluation", Raw Materials and Applications, KGK Kautschuk Gummi Kunststoffe 50, Jahrgang, Nr. Dec. 1997, based on a paper presented at the IRC Manchester, Jun. 17 to 21, 1996, part 1, f. Kautsch. Gummi Kunstst. 49(1996), 432, pp. 841 to 851.
Grosch, K., "Rolling Resistance and Fatigue Life of Tires", the 131st Rubber Div. Meeting, No. 97, 1987, pp. 1 to 25, Germany.
International Search Report dated Jun. 19, 2013 of international application PCT/EP2013/059324 on which this application is based.

* cited by examiner

*Primary Examiner* — Satya Sastri
(74) *Attorney, Agent, or Firm* — Walter Ottesen, P.A.

(57) ABSTRACT

A sulfur-crosslinkable rubber mixture, particularly for treads of pneumatic tires, comprises at least two diene rubbers and from 0.1 to 20 phr of at least one aliphatically modified C9 hydrocarbon resin and from 0.1 to 7 phr of at least one other processing ingredient. The rubber mixture has improved abrasion resistance and improved properties during braking under wet conditions for identical rolling resistance, identical chip & chunk resistance and an identical level of other tire properties.

5 Claims, No Drawings

RUBBER MIXTURE

CROSS REFERENCE TO RELATED APPLICATIONS

This application is a continuation application of international patent application PCT/EP2013/059324, filed May 6, 2013, designating the United States and claiming priority from European application 12167661.3, filed May 11, 2012, and the entire content of both applications is incorporated herein by reference.

FIELD OF THE INVENTION

The invention relates to a sulfur-crosslinkable rubber mixture, in particular for treads of motor vehicle pneumatic tires.

BACKGROUND OF THE INVENTION

Motor vehicle pneumatic tires must satisfy various requirements on the road. For example, wear, in particular of the tread, plays an important role in terms of the durability of the tire, but also in terms of environmental pollution. Harsh road surfaces, potholes, pebbles and sharp stones, in particular in the case of truck tires with frequent or occasional off-road use, can in some cases lead to sudden crumbling and thus to greater loss of material, so-called "chip & chunk". Cracks and holes in the tread normally propagate radially inwards as a result of the tangential forces during vehicle operation and can then reach the belt. This consequently has the result that the steel of the belt package of a truck tire corrodes and thus becomes less stable. The aim is to make tires last longer, and thus ultimately to increase safety on the road, by a suitable construction and a rubber mixture in the tread that is as resistant as possible to wear and chip & chunk.

The wet braking behavior is additionally particularly important for safety on the road. To that end, the tire, and in particular the rubber mixture of the tread, must absorb the energy as quickly as possible upon braking, that is, must exhibit as high an absorption as possible. During vehicle operation, however, high absorption is not desirable because it increases the rolling resistance and thus the fuel consumption, which brings with it disadvantages in terms of ecology and economy.

It is known among experts that an improvement in one tire property is accompanied by the impairment of another. A so-called trade-off exists, for example, as described, between wet braking and rolling resistance. There can be a further trade-off in respect of a tread mixture between the wear resistance and the rolling resistance or the resistance to chip & chunk. For high wear resistance, a rubber mixture having a high Shore hardness is conventionally chosen. If this increased Shore hardness is established by way of a larger amount of filler, then the rolling resistance of the tire increases. If a higher Shore hardness is achieved by adjusting the network, then the resistance to crack formation and crack propagation diminishes, in particular in the case of spontaneous sudden loads which, owing to the high forces on the tire during vehicle operation, lead to the above-described phenomenon of chip & chunk.

In order to satisfy these requirements and achieve a very good performance and durability of the tire, a plurality of different types of rubber are often used in a blend in a tread mixture, for example. This presents the challenge that different polymers do not dissolve in one another completely or even only to a very small extent. In the case of a blend of two polymers, this has the result that one polymer forms a continuous phase while the other is distributed in small domains in the continuous phase. If these local phase separations are not distributed very finely and homogeneously, the above-described tire properties are generally at a poorer level.

It is known that an improvement in the homogeneity of rubber mixtures comprising different polymers in a blend can be achieved by adding additives. Many of the processing additives that are used are modified hydrocarbon resins.

JP 3714750 B discloses a rubber mixture which comprises 100 phr of a diene rubber having a glass transition temperature of from −35 to 0° C. and a hydrocarbon resin having C5 to C9 fractions and a glass transition temperature ($T_g$) of from 5 to 100° C. In the tire, this mixture exhibits an improved grip performance and thus better acceleration and braking properties.

From U.S. Pat. No. 8,318,861 there is known a rubber mixture which comprises an indene-based resin as the C9 fraction having an indene content of from 30 to 80 percent by mass and a softening point of from 130 to 190° C. There is used inter alia the resin obtainable under the trade name NOVARES® TN 170 having a glass transition temperature ($T_g$) of 120° C.

US 2011/0190416 A1 discloses a rubber mixture with improved grip on ice, and thus improved acceleration and braking behavior on ice. This mixture can comprise inter alia from 3 to 60 phr of a C9 hydrocarbon resin having a glass transition temperature of greater than 20° C. 10 phr of a resin having a $T_g$ of 72° C. are preferably used.

US 2008/0009564 A1 discloses a rubber mixture which comprises as plasticizer system from 5 to 35 phr of MES (mild extraction solvate) or TDAE (treated distillate aromatic extract) oil and from 5 to 35 phr of a copolymer resin of a C5 fraction and a vinyl aromatic fraction. The latter can be a C9 fraction; styrene (C7 fraction) is preferred. The glass transition temperature of these resins is greater than 20° C. The rolling resistance, wet grip and chip & chunk performance of the rubber mixture are improved.

It is a common feature of all the documents that they do not contain further details regarding the wear behavior of the respectively mentioned rubber mixtures.

SUMMARY OF THE INVENTION

The object underlying the invention is to provide a rubber mixture which permits an improvement in the wear properties and wet braking while the rolling resistance, chip & chunk resistance and the other tire properties remain unchanged at the same level. At the same time, the rubber mixture is to exhibit good processability.

The object is achieved according to the invention in that the rubber mixture comprises
  at least two diene rubbers;
  from 0.1 to 20 phr of at least one aliphatically modified C9 hydrocarbon resin; and,
  from 0.1 to 7 phr of at least one further processing aid.

The term phr (parts per hundred parts of rubber by weight) used in this specification is the quantity conventional in the rubber industry for mixture compositions. The apportioning of the parts by weight of the individual substances is always based on 100 parts by weight of the total mass of all the rubbers present in the mixture.

Surprisingly, the rubber mixture according to the invention exhibits very good wear properties without the further vulcanizate properties being negatively impaired. In particular, optimized wet braking behavior is additionally found.

The rubber mixture according to the invention comprises at least two diene rubbers in a blend. The diene rubbers include all rubbers having an unsaturated carbon chain which are derived at least in part from conjugated dienes.

Diene rubbers which can be used are, for example, natural polyisoprene (NR), synthetic polyisoprene (IR), polybutadiene (BR), styrene-butadiene rubber (SBR), styrene-isoprene-butadiene terpolymer, butyl rubber, halobutyl rubber, ethylene-propylene-diene rubber (EPDM) or modified diene rubbers. The modification can be modifications with hydroxyl groups and/or ethoxy groups and/or epoxy groups and/or siloxane groups and/or amino groups and/or aminosiloxane and/or carboxyl groups and/or phthalocyanine groups. However, further modifications known to the person skilled in the art, also referred to as functionalizations, are also suitable. Metal atoms can be a constituent of such functionalizations.

The styrene-butadiene copolymer can be solution-polymerized styrene-butadiene copolymer (S-SBR) having a styrene content, based on the polymer, of approximately from 5 to 45% by weight and a vinyl content (content of 1,2-bonded butadiene, based on the total polymer) of from 5 to 70% by weight, which can be prepared, for example, using lithium alkylene in organic solvent. The S—SBRs can also be coupled and/or end-group modified and/or backbone modified. The modification can be the above-described groups and functionalizations.

However, emulsion-polymerized styrene-butadiene copolymer (E-SBR) as well as mixtures of E-SBR and S-SBR can also be used. The styrene content of the E-SBR is approximately from 15 to 50% by weight, and the types known from the prior art, which have been obtained by copolymerization of styrene and 1,3-butadiene in aqueous emulsion, can be used.

The polybutadiene (=butadiene rubber, BR) can be any type known to the person skilled in the art. Polybutadienes include, inter alia, the so-called high-cis and low-cis types, polybutadiene having a cis content of greater than or equal to 90% by weight being referred to as the high-cis type and polybutadiene having a cis content of less than 90% by weight being referred to as the low-cis type. A low-cis polybutadiene is, for example, Li—BR (lithium-catalyzed butadiene rubber) having a cis content of from 20 to 50% by weight. A high-cis polybutadiene is, for example, Nd—BR (neodymium-catalyzed butadiene rubber). Particularly good wear properties of the rubber mixture are achieved with Nd—BR.

The polybutadiene that is used can be end-group modified. The modification can be the above-described groups and functionalizations.

Preference is given to the use of natural and/or synthetic polyisoprene and/or polybutadiene and/or styrene-butadiene rubber in a blend.

According to a preferred further embodiment, the rubber mixture comprises from 15 to 60 phr of a natural and/or synthetic polyisoprene, from 5 to 50 phr of a polybutadiene rubber as well as from 5 to 50 phr of a styrene-butadiene rubber. Such a rubber mixture exhibits particularly advantageous wear properties in truck treads.

The disclosed rubber mixture comprises at least one aliphatically modified C9 hydrocarbon resin. C9 hydrocarbon resins denote resins that include at least in part structural units of monomers based on aromatic hydrocarbon compounds having 9 carbon atoms, also referred to as C9 fractions. By means of an additional modification step, aliphatic (non-aromatic) side chains are introduced into the resin structure.

According to the invention, the amount of aliphatically modified C9 hydrocarbon resin is from 0.1 to 20 phr. Particularly preferably, the rubber mixture comprises from 2 to 10 phr and most particularly preferably from 2 to 5 phr of the aliphatically modified C9 hydrocarbon resin. It is also conceivable within the context of this invention that two different aliphatically modified C9 hydrocarbon resins are used in a blend.

It is preferred if the aliphatically modified C9 hydrocarbon resin exhibits a softening point according to ASTM D 3461 of from 80 to 120° C., particularly preferably a softening point of from 85 to 115° C., most particularly preferably a softening point of from 90 to 110° C. Such a resin having a softening point of from 95 to 105° C. is obtainable, for example, from Rutgers Chemicals under the trade name NOVARES® TP 100.

The aliphatically modified hydrocarbon resin preferably has a glass transition temperature according to ISO11357-1 of from −150° C. to +150° C., preferably from −50° C. to +120° C.

According to the invention, the rubber mixture comprises from 0.1 to 7 phr of at least one further processing aid. Within the context of this invention, further processing aids are regarded as being processing aids that are not aliphatically modified C9 hydrocarbon resins. The further processing aids include fatty acids, metal soaps, fatty acid esters, fatty alcohols, fatty amines and mixtures thereof. Preferably, the processing aid comprises at least one metal soap. It is particularly preferred if the processing aid comprises at least one zinc soap, with which particularly good vulcanizate properties are achieved. A preferred processing aid which comprises at least one zinc soap is obtainable, for example, under the trade name Struktol® A 60.

In a particularly preferred embodiment, the rubber mixture comprises from 2 to 4 phr, particularly preferably from 2.5 to 3.5 phr, of a further processing aid.

The rubber mixture can comprise as fillers carbon black and/or silica in conventional amounts. It can additionally also comprise other fillers, such as, for example, aluminosilicates, chalk, starch, magnesium oxide, titanium dioxide or rubber gels.

The carbon blacks which can be used preferably have the following characteristics: DBP number (according to ASTM D 2414) from 90 to 200 ml/100 g, CTAB number (according to ASTM D 3765) from 80 to 170 m$^2$/g, and iodine absorption number (according to ASTM D 1510) from 10 to 250 g/kg. There can be used as the carbon black, for example, N121 (DBP =132 ml/100 g; iodine number=121 g/kg; CTAB=121 m$^2$/g). Particularly good wear properties are achieved with such a carbon black.

The silicas can be the silicas known to the person skilled in the art which are suitable as a filler for tire rubber mixtures. However, particular preference is given to the use of a finely divided, precipitated silica having a nitrogen surface area (BET surface area) (according to DIN ISO 9277 and DIN 66132) of from 35 to 350 m$^2$/g, preferably from 35 to 250 m$^2$/g, particularly preferably from 130 to 200 m$^2$/g, and a CTAB surface area (according to ASTM D 3765) of from 30 to 350 m$^2$/g, preferably from 30 to 245 m$^2$/g, particularly preferably from 125 to 195 m$^2$/g. Such silicas lead, for example in rubber mixtures for tire treads, to particularly good physical properties of the vulcanizates. In addition, advantages can be obtained in terms of the processing of the mixture as a result of a reduction of the mixing time while the product properties remain unchanged, leading to improved productivity. Accordingly, there can be used as silicas, for example, both those of the type Ultrasil® VN3 (trade name) from Evonik and highly dispersible silicas, so-called HD silicas (for example, Zeosil® 1165 MP from Rhodia).

In order to improve the processability and to bind the silica and other polar fillers which may be present to the diene rubber, silane coupling agents can be used in rubber mixtures.

There can be used as silane coupling agents all silane coupling agents known to the person skilled in the art for use in rubber mixtures. These can be, for example, 3,3'-bis(triethoxysilylpropyl)-polysulfides having from 2 to 8 sulfur atoms, such as, for example, 3,3'-bis(triethoxysilylpropyl) tetrasulfide (TESPT), the corresponding disulfide (TESPD) or also mixtures of the sulfides having from 1 to 8 sulfur atoms with different contents of the various sulfides. TESPT can also be used, for example, in the form of a mixture with industrial carbon black (trade name X5OS from Degussa).

The rubber mixture can additionally comprise plasticizers. These include all plasticizers known to the person skilled in the art, such as aromatic, naphthenic or paraffinic mineral oil plasticizers, rubber-to-liquid oils (RTL), biomass-to-liquid oils (BTL), MES (mild extraction solvate) or TDAE (treated distillate aromatic extract), plasticizer resins, or liquid polymers (for example, liquid polybutadiene).

The amount of such plasticizers is from 0 to 5 phr, preferably from 0 to 3 phr, but at least 0.1 phr.

Very good wear results are also found when the rubber mixture is free of plasticizers, that is, comprises 0 phr of plasticizer.

The rubber mixture according to the invention can further comprise conventional additives in conventional parts by weight.

These additives include, for example, a) antioxidants, such as, for example, N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydro-quinoline (TMQ), b) activators such as, for example, stearic acid, c) zinc oxide, d) waxes, and e) mastication aids, such as, for example, 2,2'-dibenzamidodiphenyl disulfide (DBD).

The vulcanization is carried out in the presence of sulfur or sulfur donors, it being possible for some sulfur donors at the same time to act as vulcanization accelerators. The sulfur or sulfur donor and also the accelerator are added to the rubber mixture in the mentioned amounts in the last mixing step.

The accelerator is preferably selected from the group consisting of the thiazole accelerators and/or the mercapto accelerators and/or the sulfenamide accelerators and/or the thiocarbamate accelerators and/or the thiuram accelerators and/or the thiophosphate accelerators and/or the thiourea accelerators and/or the xanthogenate accelerators and/or the guanidine accelerators.

Particular preference is given to the use of a sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfen-morpholide (MBS) and/or N-tert-butyl-2-benzothiazyl-sulfenamide (TBBS).

Vulcanization retarders can additionally be present in the rubber mixture.

A further object underlying the invention is to provide a motor vehicle pneumatic tire which comprises in at least one component the rubber mixture according to the invention. The component is preferably a tread, preferably of a truck.

The production of the rubber mixture according to the invention is carried out in the conventional manner, a base mixture comprising all the constituents with the exception of the vulcanization system (sulfur, sulfur donor, and substances that influence the vulcanization) generally being prepared first in one or more mixing stages, and the finished mixture subsequently being produced by addition of the vulcanization system. The mixture is then processed further, for example by an extrusion operation, and brought into the appropriate form.

The mixture is preferably brought into the form of a tread. A green tread mixture so produced is applied during production of the green tire, in particular green motor vehicle pneumatic tire, as is known. However, the tread can also be wound in the form of a narrow strip of rubber mixture onto a green tire which already comprises all the tire parts with the exception of the tread.

The rubber mixture is further suitable for the production of industrial rubber articles such as, for example, conveyors, belts, bands, hoses, printing blankets, air springs or damping elements.

DESCRIPTION OF THE PREFERRED EMBODIMENTS OF THE INVENTION

The invention will now be explained in greater detail by means of comparative and implementation examples, which are summarized in Table 1.

The comparative mixtures are identified with C and the mixtures according to the invention are identified with I.

Production of the mixture was carried out under conventional conditions in three stages in a laboratory tangential mixer. Test specimens were produced from all the mixtures by optimal vulcanization under pressure at 160° C., and material properties typical for the rubber industry were determined with these test specimens using the test methods indicated hereinbelow.

Mooney viscosity in accordance with ASTM D1646

Shore A hardness at room temperature in accordance with DIN ISO 7619-1

Rebound resilience at RT and 70° C. in accordance with DIN 53 512

Tensile strength, elongation at break and stress value at 300% static elongation at room temperature in accordance with DIN 53 504

High speed elongation at break as tear energy per deformed volume at room temperature according to High Speed Tear Energy Test (HSTE) in accordance with DIN EN 10 045

Wear according to Grosch in accordance with Grosch, K. A., The 131st ACS Rubber Div. Meeting, No. 97 (1987) and Grosch, K. A. et al., Kautschuk Gummi Kunststoffe, 50, 841 (1997).

TABLE 1

|  | Unit | C1 | I1 | C2 | I2 |
|---|---|---|---|---|---|
| Constituents |  |  |  |  |  |
| NR[a] | phr | 40 | 40 | 40 | 40 |
| Nd-BR[b] | phr | 20 | 20 | 20 | 20 |
| S-SBR[c] | phr | 40 | 40 | 40 | 40 |
| Carbon black N121 | phr | 52 | 52 | 52 | 52 |
| Resins[d] | phr | — | 3 | — | 3 |
| Processing aid[e] | phr | 3 | 3 | 3 | 3 |
| Antioxidant | phr | 6 | 6 | 6 | 6 |
| Stearic acid | phr | 2 | 2 | 2 | 2 |
| Zinc oxide | phr | 3 | 3 | 3 | 3 |
| Accelerator TBBS | phr | 1.7 | 1.7 | — | — |
| Accelerator DCBS | phr | — | — | 2.5 | 2.5 |
| Sulfur | phr | 1.7 | 1.7 | 1.7 | 1.7 |
| Properties |  |  |  |  |  |
| Mooney viscosity ML (1 + 4) at 100° C. | Mooney units | 84 | 77 | 79 | 74 |
| Hardness at RT | Shore A | 68 | 67 | 67 | 65 |
| Rebound resilience at RT | % | 49.6 | 47.9 | 47.9 | 46.8 |
| Rebound resilience at 70° C. | % | 60.5 | 59.9 | 58.9 | 59.3 |

TABLE 1-continued

|  | Unit | C1 | I1 | C2 | I2 |
|---|---|---|---|---|---|
| Tensile strength at RT | MPa | 16.5 | 18.3 | 19.4 | 16.8 |
| Elongation at break at RT | % | 314 | 357 | 379 | 365.6 |
| Modulus 300% | MPa | 17.6 | 16.0 | 15.7 | 14.2 |
| HSTE | MJ/cm$^3$ | 2.7 | 3.0 | 3.2 | 3.4 |
| Grosch wear | % | 100 | 129 | 100 | 127 |

$^{a)}$NR: SMR10 CE
$^{b)}$Nd-BR: Europrene NeoCis BR 40, Polimeri Europa GmbH
$^{c)}$S-SBR: Nipol NS 112R, Nippon Zeon
$^{d)}$Resin: NOVARES ® TP 100, Rutgers Chemicals
$^{e)}$Struktol ® A60, Struktol As is apparent from Table 1, the wear performance of exemplary mixtures I1 and I2 according to the invention improves significantly compared with their respective comparative mixtures C1 and C2 without the other properties being impaired. The lower rebound resiliencies at room temperature of mixtures I1 and I2 are indicators that the wet braking behavior of these mixtures is improved compared with C1 and C2, respectively. The higher HSTE values of mixtures I1 and I2 are indicators that the chip & chunk resistance is improved compared with C1 and C2, respectively.

It is understood that the foregoing description is that of the preferred embodiments of the invention and that various changes and modifications may be made thereto without departing from the spirit and scope of the invention as defined in the appended claims.

What is claimed is:

1. A motor vehicle pneumatic tire, comprising in at least one tire component at least one rubber mixture, the rubber mixture comprising:
    a blend of at least two rubber components;
    from 0.1 to 20 phr of at least one C9 hydrocarbon resin being modified by addition of aliphatic side chains; and,
    from 0.1 to 7 phr of at least one further processing aid,
    wherein the rubber components of the blend are selected from the group consisting of natural polyisoprene, synthetic polyisoprene, polybutadiene, and styrene-butadiene rubber.

2. The rubber mixture as claimed in claim 1, wherein the aliphatically modified C9 hydrocarbon resin has a softening point between 80° C. and 120° C.

3. The rubber mixture as claimed in claim 1, wherein the amount of aliphatically modified C9 hydrocarbon resin is from 2 to 10 phr.

4. The rubber mixture as claimed in claim 1, wherein the further processing aid comprises at least one zinc soap.

5. The motor vehicle pneumatic tire as claimed in claim 1, wherein the tire component is a tread.

* * * * *